United States Patent Office 3,221,019
Patented Nov. 30, 1965

3,221,019
N-ALKINYL AND N-ALKINYLOXY-AMIDES OF 4-PHENYL - 1,2,5,6 - TETRAHYDROPYRIDINO ALKANOIC ACIDS AND INTERMEDIATES THEREOF
John H. Biel and Harvey B. Hopps, Milwaukee, Wis., assignors to Aldrich Chemical Company, Inc., Milwaukee, Wis., a corporation of Wisconsin
No Drawing. Filed Apr. 7, 1964, Ser. No. 358,115
12 Claims. (Cl. 260—295)

This invention relates to novel 4-arylpyridines. More particularly, this invention relates to N-alkinyl and N-alkinyloxy amides of 4-phenyl-1,2,5,6-tetrahydropyridino alkanoic acids and a process for the preparation thereof. In a further aspect, this invention relates to novel intermediates useful in processes for preparing the novel 4-arylpyridines of this invention.

In accordance with the present invention, there is provided a member selected from the group consisting of 4-arylpyridines of the formula (I)

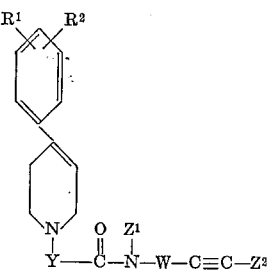

wherein $R^1$ and $R^2$ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di (lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive and cycloalkoxy radicals having from 5 to 7 carbon atoms inclusive;
W is a member selected from the group consisting of oxy(lower)alkylene and (lower)alkylene radicals;
Y is a (lower)alkylene radical;
$Z^1$ and $Z^2$ are each a member selected from the group consisting of hydrogen, (lower)alkyl, and radicals of the formulae (II)

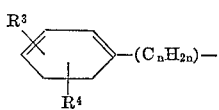

and (III)

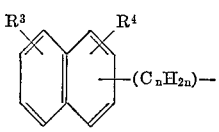

wherein $n$ is a whole integer from 0 to 6 inclusive, and
$R^3$ and $R^4$ are each a member selected from the group consisting of hydrogen, chloro, bromo, iodo, fluoro, trifluoromethyl, amino, nitro, (lower)alkyl, (lower)- alkoxy, hydroxy, phenyl, phenoxy, benzyl, (lower)alkylamino, di(lower)alkylamino, (lower)alkanoylamino, (lower)alkylthio, sulfamyl, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive and cycloalkoxy radicals having from 5 to 7 carbon atoms inclusive;

and the pharmateutically acceptable nontoxic salts thereof.

Among the radicals represented by $R^1$, $R^2$, $R^3$ and $R^4$, hydrogen, chloro, bromo, iodo, fluoro, trifluoromethyl, nitro, (lower)alkyl, (lower)alkoxy, (lower)alkylthio, (lower)alkanoyl, phenyl, phenoxy and benzyl are preferred; preferably $R^1$ or $R^2$ and $R^3$ or $R^4$ are hydrogen and usually $R^1$, $R^2$, $R^3$ and $R^4$ are all hydrogen. W is preferably methylene and $Z^1$ is preferably hydrogen.

The pharmaceutically acceptable nontoxic salts include the organic and inorganic acid addition salts, e.g. those prepared from acids such as hydrochloric, sulfuric, sulfamic, tartaric, fumaric, hydrobromic, hydriodic, glycolic, citric, maleic, phosphoric, succinic, acetic and the like.

The term "(lower)alkyl" as used herein means both straight and branched chain aliphatic hydrocarbon radicals having from 1 to 8 carbon atoms such as methyl, ethyl, propyl, isopropyl, butyl, isobutyl, t-butyl, amyl, hexyl, 2-ethylhexyl, etc.

Similarly, where the term "(lower)" is used as part of the description of another group, e.g. "(lower)alkoxy," it refers to the alkyl portion of such group which is therefore as described in connection with "(lower)alkyl."

The meaning of the term "(lower)alkylene" is similar to that of "(lower)alkyl" in that it also means both straight and branched chain aliphatic hydrocarbon radicals having from 1 to 8 carbon atoms. Examples of "(lower)alkylene" radicals are methylene, ethylene, propylene, isopropylene, butylene, isobutylene, t-butylene, amylene, hexylene, 2-ethylhexylene and the like.

The compounds of this invention are valuable pharmaceutical agents. They produce pain relief which makes the compounds useful as analgesic agents. In addition, the compounds, being tertiary bases, can be used to recover and purify penicillin with which they form salts.

The 4-arylpyridines of the present invention were tested for analgesic activity by the phenylquinone test of Sigmund et al., Proc. Soc. Expt'l. Biol. and Med., 95, 729 (1957) in which an analgesic reduces the induced writhing of the mice. The compounds were administered at dosages of 150 mgm./kg. p.o. in mice, 50 minutes before the phenyl-p-quinone was injected. The reduction in induced writhing was determined at the end of the first hour. When, for example, N-benzyl-N-2-propinyl-β-(4-phenyl-1,2,5,6-tetrahydropyridino)propionamide fumarate was tested, the reduction in induced writhing at the end of the first hour was found to be 67% for the compound compared to 65% for aspirin. This indicated that N - benzyl - N-2-propinyl-β-(4-phenyl-1,2,5,6-tetrahydropyridino)propionamide fumarate is an analgesic agent with a potency of the order of that of aspirin.

The compounds of the present invention are prepared by the following series of steps:

(1) An alkinyl or alkinyloxyamine of the formula

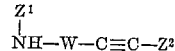

wherein W, $Z^1$ and $Z^2$ are as represented above, is re-} acted with an equimolar quantity of a halo- or tosyl acid chloride of the formula

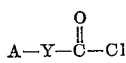

wherein A is a radical selected from the group consisting of chloro, bromo, iodo or tosyl, and Y is as represented above according to the method described in U.S. Patent No. 2,569,288 and by A. Marszak-Fleury, Ann. Chim. (Paris), [13] 3:656 (1958); C.A. 54:3178i (1960).

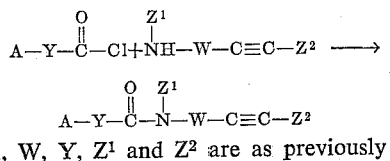

wherein A, W, Y, $Z^1$ and $Z^2$ are as previously defined. The product, an N-alkinyl or alkinyloxy halo- or tosylalkanoic acid amide, is a novel intermediate, useful in the second step of the method for the preparation of the 4-aryl-1,2,5,6-tetrahydropyridines of Formula I, and is considered within the scope of this invention.

(2) The N-alkinyl or alkinyloxy halo- or tosylalkanoic acid amide prepared in Step 1 or a quaternary ammonium salt of the compound, (e.g. $CHCH_3CH_2NI$) is then reacted with an equimolar quantity of a 1,2,5,6-tetrahydropyridine of the formula

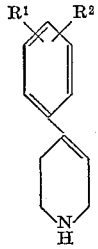

wherein $R^1$ and $R^2$ are as described above, in the presence of triethylamine and dimethylformamide, and a trace of potassium iodide at elevated temperature, i.e., 65–70° C., for several hours according to the procedure described in United States Patent No. 2,929,818. The cooled reaction mixture is then poured into water containing an equimolar amount of sodium hydroxide. The free base is collected by filtration and dried.

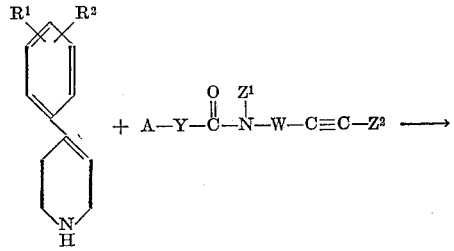

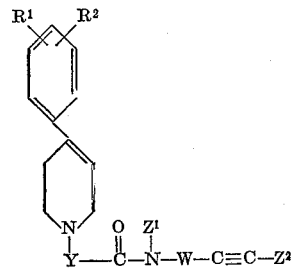

wherein A, $R^1$, $R^2$, W, Y, $Z^1$ and $Z^2$ are as defined above.

The free base may be readily converted, if desired, to a nontoxic acid addition salt by conventional procedures.

An alternate procedure for preparing the compounds of the invention comprises the addition of the secondary piperidine to an acrylic acid amide or a substituted acid amide in the presence of a strong base, e.g., sodium hydroxide, according to the equation

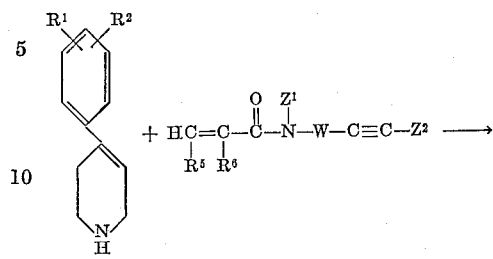

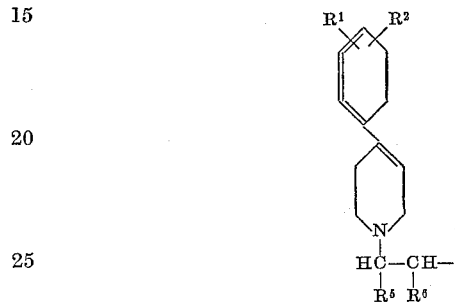

wherein $R^1$, $R^2$, W, $Z^1$ and $Z^2$ are as represented above, and $R^5$ and $R^6$ are each hydrogen or (lower)alkyl.

A third procedure by which the compounds can be prepared involves the reaction of a halo- or tosylalkanoic acid ester with the secondary piperidine and subsequent conversion to the amide

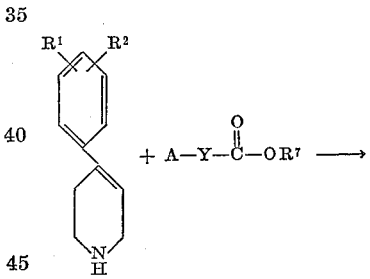

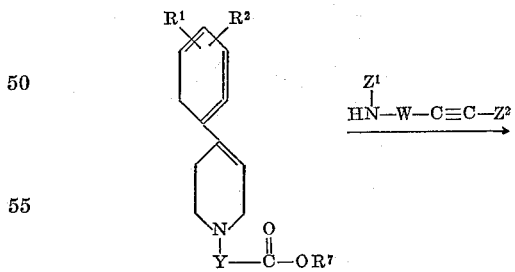

wherein A, $R^1$, $R^2$, W, Y, $Z^1$ and $Z^2$ are as described above, and $R^7$ is methyl, ethyl, p-nitrophenyl, cyanomethyl, succinimido, phthalimido, and $OR^7$ may also be chloro or bromo.

In each of the three methods for the preparation of the compounds of this invention, the secondary piperidine and other reactants are brought together in a suitable medium such as dimethylformamide, ethanol, isopropyl alcohol, toluene, xylene, dimethoxyethane, diethyleneglycol, and heated at 50–100° C., for several hours in the presence of a base such as triethylamine, aminopyrine, diethylaniline, potassium carbonate and triethyl phenyl ammonium hydroxide. The cooled reaction mixture is then poured into dilute sodium hydroxide. The basic amide or ester precipitates either as a water-insoluble oil or a crystalline solid, and is extracted with such solvents as methylene dichloride, chloroform, carbon tetrachloride, or by filtration of the solid product. In the case of the third process, the ester that is obtained, is reacted with propinylamine, or a substituted propinylamine; the product is then converted to a nontoxic acid addition salt.

It is obvious that in some cases, the radicals attached to the aromatic ring, e.g., the amino radical, will interfere with the reactions used in preparing the compounds of this invention. Therefore, it is necessary to block the reactive radicals before proceeding with the reactions. This is conveniently accomplished by methods known in the art. For example, in the case of an amino substituted aromatic ring, the amino group is blocked by forming the Schiffs' base by reacting the aromatic amine with an aldehyde such as acetaldehyde, and after all reactions have been completed, the Schiffs' base may be cleaved with dilute hydrochloric acid to regenerate the free amino group.

The starting materials necessary for the processes described herein are compounds which are either commercially available, well known in the prior art, or easily prepared in accordance with standard organic procedures preciously described in the chemical literature. For example, one method for preparing propargyloxyamine is described in British Patent No. 889,086. Another convenient method for preparing propargyloxyamine consists of first reacting hydroxylphthalimide with propargyl bromide in the presence of potassium carbonate and a solvent such as dimethylformamide to produce N-propargyloxyphthalimide and then reacting the N-propargyloxyphthalimide with acetic acid in the presence of concentrated hydrochloric acid to form propargyloxyamine. The preparation of propargylamines are described by A. Marszak-Fleury, Ann. Chim. (Paris) [13] 3:656 (1958); C.A. 54:3178i (1960).

The compounds of this invention may be administered as the free bases or in the form of their nontoxic addition salts. They may be compounded and formulated into pharmaceutical preparations for oral or parenteral administration with organic or inorganic solid materials or liquids which are pharmaceutically acceptable carriers. The compositions may take the form of tablets, powder granules, capsules, suspensions, solutions and the like. Such compositions are considered within the scope of this invention.

The following examples are intended to illustrate the invention described herein without unduly limiting it.

EXAMPLE 1

*Preparation of propargyloxyamine*

A mixture of hydroxylphthalimide (40.5 gm.), propargyl bromide (120 gm.), potassium carbonate (18 gm.), and dimethylformamide (15 gm.), is refluxed for 24 hours. After cooling, N-propargyloxyphthalimide crystallizes from the mixture. After adding 30 ml. of ethanol, the mixture is filtered with suction, washed with ethanol, and then ground in a mortar with water. It is filtered again, and washed with water until free of bromine, washed again with ethanol and air-dried. Crude N-propargyloxyphthalimide is obtained which is found to weigh 31 gm. and have a melting point of 146–149° C. Pure N-propargyloxyphthalimide is obtained by recrystallization from ethanol and has a melting point of 149–150° C., and the following analysis:

*Analysis.*—Calc'd for $C_{11}H_7NO_3$: C, 65.67%; H, 3.51%; N, 6.96%. Found: C, 65.30%; H, 3.62%; N, 7.03%.

A mixture of propargyloxyphthalimide (30 gm.), glacial acetic acid (125 ml.), and concentrated hydrochloric acid (35 ml.), is heated with stirring, and refluxed for 0.25 hour. Rapid solution occurs. After cooling, the mixture is neutralized with concentrated sodium hydroxide solution to pH 8.0. Then the solution is extracted with methylene chloride and a salt of propargyloxyamine is precipitated by treating with hydrogen chloride; and weighs 7.5 gm. and has a melting point of 156–158° C. The salt is dissolved in n-butanol (60 ml.) at 60° C., 20 ml. of ether are added, and the mixture cooled very slowly, finally, in a refrigerator. Propargyloxyamine is obtained, weighing 5 gm., and having a melting point of 160–161° C. The structure is confirmed by infrared analysis.

EXAMPLE 2

*Preparation of N-propargyloxy-β-chloropropionamide*

To a stirred solution of β-chloropropionyl chloride (105 gm., 0.826 mole) and benzene (1 liter), cooled to 5° C., is added a solution containing propargyloxyamine (58.8 gm.; 0.826 mole) and triethylamine (83.5 gm.; 0.826 mole) during a period of two hours. The reaction mixture is clarified by filtration, washed with dilute sodium hydroxide followed by a dilute acid wash and the benzene solution concentrated in vacuo. The residue crystallizes on standing and the solid product is collected by filtration. Recrystallization from benzene-heptane yields 35 gm. of N-propargyloxy-β-chloropropionamide having a melting point of 86–87.5° C.

EXAMPLE 3

*Preparation of N-propargyl-β-chloropropionamide*

To a stirred solution of β-chloropropionyl chloride (0.826 mole) and benzene (1 liter), cooled to 5° C., is added a solution containing propargylamine (0.826 mole) and triethylamine (83.5 gm.; 0.826 mole) during a period of two hours. The reaction mixture is clarified by filtration, washed with dilute sodium hydroxide followed by a dilute acid wash and the benzene solution concentrated in vacuo. The residue crystallizes on standing and the solid product is collected by filtration. Recrystallization from benzene-heptane yields N-propargyl-β-chloropropionamide.

EXAMPLE 4

*Preparation of N-benzyl N-propargyl-β-chloropropionamide*

To a stirred solution of β-chloropropionyl chloride (12.7 gm.; 0.1 mole) dissolved in 60 ml. of benzene, cooled to 0° C., is added a solution containing N-benzyl-N-propargylamine (14.5 gm.; 0.1 mole), triethylamine (10.1 gm.; 0.1 mole), and benzene (60 ml.). The rate of addition is adjusted to keep the reaction below 10° C. The mixture is stirred for two hours at 10° C. and then permitted to warm to room temperature overnight. The insoluble precipitate is removed by filtration and washed with approximately 200 ml. of hot benzene. The combined filtrate and washings are dried over potassium carbonate. The benzene solution is concentrated to produce 13.4 gm. of N-benzyl-N-propargyl-β-chloropropionamide.

EXAMPLE 5

When equivalent quantities of the appropriate starting materials are substituted in the above procedures, the following compounds are obtained N-(2-propinyl)-β-bromopropionamide,
N-(2-propinyl)-γ-bromopropionamide, N-(2-propinyl)-N-benzyl-β-bromobutyramide,
N-(2-butinyl)-α-methyl-β-chloropropionamide,
N-(1-methyl-2-propinyl)-γ-bromobutyramide,
N-(1,1-dimethyl-2-propinyl)-β-chloropropionamide,
N-(2-propinyl)-β-chloroacetamide,
N-(2-propinyl)-β-iodopropionamide,
N-(2-propinyl)-γ-chlorohexanoamide,
N-(2-propinyl)-β-tosylpropionamide,
N-(2-propinyl)-α-chloropropionamide,
N-(2-propinyl)-N-methyl-β-chloropropionamide,
N-(2-propinyl)-N-propyl-β-chloropropionamide,
N-(2-propinyl)-N-phenyl-β-chloropropionamide,
N-(2-propinyl)-N-(4-trifluoromethylphenyl)-β-chloropropionamide,
N-(2-propinyl)-N-(1-naphthyl)-β-chloropropionamide,
N-(2-propinyl)-N-(1-methyl-2-naphthyl)-β-chloropropionamide,
N-(3-phenyl-2-propinyl)-β-chloropropionamide,
N-(3-ethyl-2-propinyl)-β-chloropropionamide,
N-(3-isopropyl-2-propinyl)-β-chloropropionamide,
N-(3-benzyl-2-propinyl)-β-chloropropionamide,
N-(3-1-naphthyl-2-propinyl)-β-chloropropionamide,
N-(3-2-naphthyl-2-propinyl)-β-chloropropionamide,
N-(3-1-naphthylmethyl-2-propinyl)-β-chloropropionamide,
N-(3-4-chlorophenyl-2-propinyl)-β-chloropropionamide,
N-(3-4-trifluoromethylphenyl-2-propinyl)-β-chloropropionamide,
N-(3-4-methylphenyl-2-propinyl)-β-chloropropionamide,
N-(3-2-fluorophenyl-2-propinyl)-β-chloropropionamide,
N-(3-3-methylphenyl-2-propinyl)-β-chloropropionamide,
N-(3-3-bromophenyl-2-propinyl)-β-chloropropionamide,
N-(3-4-hydroxyphenyl-2-propinyl)-β-chloropropionamide,
N-(3-2-methylaminophenyl-2-propinyl)-β-chloropropionamide,
N-(3-4-dimethylaminophenyl-2-propinyl)-β-chloropionamide,
N-(3-2,6-dichlorophenyl-2-propinyl)-β-chloropropionamide,
N-(3-4-methylthiophenyl-2-propinyl)-β-chloropropionamide,
N-(3-2-sulfamylphenyl-2-propinyl)-β-chloropropionamide,
N-(3-4-cyclohexylphenyl-2-propinyl)-β-chloropropionamide,
N-(3-4-cyclohexyloxyphenyl-2-propinyl)-β-chloropropionamide,
N-(3-4-nitrophenyl-2-propinyl)-β-chloropropionamide,
N-(3-2-aminophenyl-2-propinyl)-β-chloropropionamide,
N-(3-2-iodo-4-methylphenyl-2-propinyl)-β-chloropropionamide,
N-(3-4-isopropylphenyl-2-propinyl)-β-chloropropionamide,
N-(3-4-phenylphenyl-2-propinyl)-β-chloropropionamide,
N-(3-3-phenoxyphenyl-2-propinyl)-β-chloropropionamide,
N-(3-4-benzylphenyl-2-propinyl)-β-chloropropionamide,
N-(3-3-acetamidophenyl-2-propinyl)-β-chloropropionamide,
N-(3,4-acetylphenyl-2-propinyloxy)-β-chloropropionamide,
N-(3-2-ethylsulfonylphenyl-2-propinyl)-N-benzyl-β-chloropropionamide,
N-(3-3,4-methylenedioxyphenyl-2-propinyl)-N-phenyl-β-chlorobutyramide,
N-(3-4-fluorophenyl-2-propinyl)-β-chloropropionamide,
N-(3-4-chlorobenzylphenyl-2-butinyloxy)-N-benzyl-β-chloropropionamide,
N-(3-1-methyl-2-naphthylphenyl-2-propinyl)-β-chloropropionamide,
N-(3-2-chloro-1-naphthylmethylphenyl-2-propinyl)-β-chloropropionamide, and
N-(3-phenethylphenyl-2-propinyloxy)-β-chloropropionamide.

EXAMPLE 6

*Preparation of N-propargyl-β-(4-phenyl-1,2,5,6-tetrahydropyridino)propionamide*

A mixture containing 0.05 mole of 4-phenyl-1,2,5,6-tetrahydropyridine, 0.05 mole of N-propargyl-β-chloropropionamide, 0.06 mole of triethylamine, and 30 ml. of dimethylformamide is stirred and heated at 70° for 4 hours. The reaction mixture is poured into 300 ml. of water containing 0.05 mole of sodium hydroxide. The product, N-propargyl-β-(4-phenyl-1,2,5,6-tetrahydropyridino)propionamide, separates as an oil which crystallizes upon standing.

EXAMPLE 7

*Preparation of N-propargyl-β-(4-phenyl-1,2,5,6-tetrahydropyridino)propionamide hydrochloride*

The compound, N-propargyl-β-(4-phenyl-1,2,5,6-tetrahydropyridino)propionamide, prepared in Example 6, is dissolved in methylene chloride and converted to its hydrochloride salt by passing gaseous hydrogen chloride into the solution. The N-propargyl-β-(4-phenyl-1,2,5,6-tetrahydropyridino)propionamide hydrochloride precipitates out, and is recrystallized from n-butanol, and has a melting point of 107–110° C.

EXAMPLE 8

*Preparation of N-propargyloxy-β-(4-phenyl-1,2,5,6-tetrahydropyridino)propionamide fumarate*

A mixture containing 0.05 mole of 4-phenyl-1,2,5,6-tetrahydropyridine, 0.05 mole of N-propargyloxy-β-chloropropionamide, 0.06 mole of triethylamine and 30 ml. of dimethylformamide is stirred and heated at 70° C. for four hours. The reaction mixture is poured into 300 ml. of water containing 0.05 mole of sodium hydroxide. The product, N-propargyloxy-β-(4-phenyl-1,2,5,6-tetrahydropyridino)propionamide separates and is reacted with an equivalent amount of fumaric acid to form N-propargyloxy - β - (4 - phenyl - 1,2,5,6 - tetrahydropyridino)-propionamide fumarate which crystallizes out and has a melting point of 141–142.5° C.

EXAMPLE 9

*Preparation of N-benzyl-N-propargyl-β-(4-phenyl-1,2,5,6-tetrahydropyridino)propionamide maleate*

A mixture containing 4-phenyl-1,2,5,6-tetrahydropyridine (0.05 mole), N-benzyl-N-propargyl-β-chloropropionamide (0.05 mole), triethylamine (0.06 mole), and dimethylformamide (30 ml.) is heated at 70° C. for four hours. The reaction mixture is poured into water (300 ml.) containing sodium hydroxide (0.05 mole), and the product, N-benzyl-N-propargyl-β-(4-phenyl-1,2,5,6-tetrahydropyridino)propionamide, is separated as an oil. The product is then reacted with an equivalent amount of maleic acid to form N-benzyl-N-propargyl-β-(4-phenyl-1,2,5,6-tetrahydropyridino)propionamide maleate which is found to have a melting point of 138–139° C., and the following analysis.

*Analysis.*—Calc'd. for $C_{28}H_{30}N_2O_5$: C, 70.86%; H, 6.37%; N, 5.90%. Found: C, 70.97%; H, 6.29%; N, 5.91%.

EXAMPLE 10

When equivalent quantities of the appropriate starting materials are substituted in the above procedures, the following compounds are obtained:

N-2-propinyl-β-(4-phenyl-1,2,5,6-tetrahydropyridino)-butyramide,
N-2-propinyl-γ-(4-phenyl-1,2,5,6-tetrahydropyridino)-butyramide,
N-2-butinyloxy-β-(4-phenyl-1,2,5,6-tetrahydropyridino)-propionamide,
N-2-propinyloxy-β-(4-phenyl-1,2,5,6-tetrahydropyridino)-butyramide, N-2-butinyloxy-β-(4-phenyl-1,2,5,6-tetrahydropyridino)-butyramide,
N-(1,1-dimethyl-2-butinyl)-γ-(4-phenyl-1,2,5,6-tetrahydropyridino)-butyramide,
N-(2-propinyl)-α-methyl-β-(4-phenyl-1,2,5,6-tetrahydropyridino)-propionamide,
N-(benzyl)-N-(2-propinyl)-γ-(4-phenyl-1,2,5,6-tetrahydropyridino)-butyramide,
N-propargyl-N-(4-trifluoromethylphenyl)-β-(4-phenyl-1,2,5,6-tetrahydropyridino)propionamide,
N-(3-ethyl-2-propinyl)-β-(4-phenyl-1,2,5,6-tetrahydropyridino)propionamide,
N-(3-isopropyl-2-propinyloxy)-β-(4-phenyl-1,2,5,6-tetrahydropyridino)-propionamide,
N-(3-phenyl-2-propinyl)-β-(4-phenyl-1,2,5,6-tetrahydropyridino)propionamide,
N-(3-benzyl-2-propinyl)-β-(4-phenyl-1,2,5,6-tetrahydropyridino)propionamide,
N-(3-1-naphthyl-2-propinyl)-β-(4-phenyl-1,2,5,6-tetrahydropyridino)-propionamide,
N-(3-2-naphthyl-2-propinyl)-N-phenyl-β-(4-phenyl-1,2,5,6-tetrahydropyridino)propionamide,
N-(3-1-naphthylmethyl-2-propinyloxy)-β-(4-phenyl-1,2,5,6-tetrahydropyridino)propionamide,
N-(3-4-chlorophenyl-2-propinyl)-β-(4-phenyl-1,2,5,6-tetrahydropyridino)propionamide,
N-(3-4-trifluoromethylphenyl-2-propinyl)-β-(4-phenyl-1,2,5,6-tetrahydropyridino)propionamide,
N-(4-4-methylphenyl-2-butinyl)-β-(4-phenyl-1,2,5,6-tetrahydropyridino)propionamide,
N-(3-2-fluorophenyl-2-propionyl)-N-(4-chlorophenyl)-β-(4-phenyl-1,2,5,6-tetrahydropyridino)propionamide,
N-(3-3-methylphenyl-2-propinyl)-β-(4-4-trifluoromethylphenyl-1,2,5,6-tetrahydropyridino)propionamide,
N-(3-3-bromophenyl-2-propinyl)-β-(4-phenyl-1,2,5,6-tetrahydropyridino)propionamide,
N-(3-4-hydroxyphenyl-2-propinyl)-β-(4-phenyl-1,2,5,6-tetrahydropyridino)propionamide,
N-(3-2-methylaminophenyl-2-propinyl)-N-(2,6-dichlorophenyl)-β-(4-4-methylphenyl-1,2,5,6-tetrahydropyridino)propionamide,
N-(3-4-dimethylaminophenyl-2-propinyl)-β-(4-phenyl-1,2,5,6-tetrahydropyridino)propionamide,
N-(3-2,6-dichlorophenyl-2-propinyl)-β-(4-phenyl-1,2,5,6-tetrahydropyridino)propionamide,
N-(3-4-methylthiophenyl-2-propinyl)-β-(4-phenyl-1,2,5,6-tetrahydropyridino)propionamide,
N-(3-2-sulfamylphenyl-2-propinyl)-β-(4-phenyl-1,2,5,6-tetrahydropyridino)propionamide,
N-(3-4-cyclohexylphenyl-2-propinyl)-β-(4-phenyl-1,2,5,6-tetrahydropyridino)propionamide,
N-(3-4-cyclohexyloxyphenyl-2-propinyl)-β-(4-phenyl-1,2,5,6-tetrahydropyridino)propionamide,
N-(3-4-nitrophenyl-2-propinyl)-β-(4-phenyl-1,2,5,6-tetrahydropyridino)propionamide,
N-(3-2-aminophenyl-2-propinyl)-β-(4-phenyl-1,2,5,6-tetrahydropyridino)propionamide,
N-(3-2-iodo-4-methylphenyl-2-propinyl)-β-(4-phenyl-1,2,5,6-tetrahydropyridino)propionamide,
N-(3-4-isopropylphenyl-2-propinyl)-β-(4-phenyl-1,2,5,6-tetrahydropyridino)propionamide,
N-(3-4-phenylphenyl-2-propinyl)-β-(4-phenyl-1,2,5,6-tetrahydropyridino)propionamide,
N-(3-4-benzylphenyl-2-propinyl)-N-benzyl-β-(4-4-benzylphenyl-1,2,5,6-tetrahydropyridino)propionamide,
N-(3-3-phenoxyphenyl-2-propinyl)-β-(4-phenyl-1,2,5,6-tetrahydropyridino)propionamide,
N-(3-4-benzylphenyl-2-propinyl)-β-(4-phenyl-1,2,5,6-tetrahydropyridino)propionamide,
N-(3-3-acetamidophenyl-2-propinyl)-β-(4-phenyl-1,2,5,6-tetrahydropyridino)propionamide,
N-(3-4-acetylphenyl-2-propinyl)-β-(4-phenyl-1,2,5,6-tetrahydropyridino)propionamide,
N-(3-2-ethylsulfonylphenyl-2-propinyl)-β-(4-phenyl-1,2,5,6-tetrahydropyridino)propionamide,
N-(3-2,3-methylenedioxyphenyl-2-propinyl)-β-(4-phenyl-1,2,5,6-tetrahydropyridino)propionamide,
N-(3-4-fluorophenyl-2-propinyl)-β-(4-phenyl-1,2,5,6-tetrahydropyridino)propionamide,
N-(3-4-chlorobenzylphenyl-2-propinyl)-β-(4-phenyl-1,2,5,6-tetrahydropyridino)propionamide,
N-(3-1-methyl-2-naphthyl-2-propinyl)-β-(4-phenyl-1,2,5,6-tetrahydropyridino)propionamide,
N-(3-2-chloro-1-naphthylmethyl-2-propinyl)-β-(4-phenyl-1,2,5,6-tetrahydropyridino)propionamide,
N-(3-phenethyl-2-propinyl)-β-(4-phenyl-1,2,5,6-tetrahydropyridino)propionamide,
N-(3-phenyl-2-propinyloxy)-β-(4-phenyl-1,2,5,6-tetrahydropyridino)propionamide,
N-(2-propinyl)-β-[4-(4-chlorophenyl)-1,2,5,6-tetrahydropyridino]propionamide,
N-(2-propinyl)-β-[4-(4-trifluoromethylphenyl)-1,2,5,6-tetrahydropyridino]propionamide,
N-2-butinyl-N-(4-methylphenyl)-β-[4-(3-fluorophenyl)-1,2,5,6-tetrahydropyridino]propionamide,
N-2-propinyl-β-[4-(2-trifluoromethylphenyl)-1,2,5,6-tetrahydropyridino]propionamide,
N-2-propinyl-β-[4-(2-bromophenyl)-1,2,5,6-tetrahydropyridino]propionamide,
N-2-propinyl-β-[4-(3-chlorophenyl)-1,2,5,6-tetrahydropyridino]propionamide,
N-2-propinyl-N-(1-naphthyl)-β-[4-(2-sulfamylphenyl)-1,2,5,6-tetrahydropyridino]propionamide,
N-2-propinyl-β-[4-(3-hydroxyphenyl)-1,2,5,6-tetrahydropyridino]propionamide,
N-2-propinyl-β-[4-(4-ethylphenyl)-1,2,5,6-tetrahydropyridino]propionamide,
N-2-propinyl-β-[4-(3-methylphenyl)-1,2,5,6-tetrahydropyridino]propionamide,
N-2-propinyl-β-[4-(2,4-dimethoxyphenyl)-1,2,5,6-tetrahydropyridino]propionamide,
N-(3-phenyl-2-propinyl)-β-[4-(3-methylthiophenyl)-1,2,5,6-tetrahydropyridino]propionamide,
N-2-propinyl-β-[4-(2-aminophenyl)-1,2,5,6-tetrahydropyridino]propionamide,
N-2-propinyl-β-[4-(4-chlorophenyl)-1,2,5,6-tetrahydropyridino]propionamide,
N-2-propinyl-β-[4-(3-trifluoromethylphenyl)-1,2,5,6-tetrahydropyridino]propionamide,
N-2-propinyl-β-[4-(3,4-methylenedioxyphenyl)-1,2,5,6-tetrahydropyridino]propionamide,
N-2-propinyl-β-[4-(4-methoxyphenyl)-1,2,5,6-tetrahydropyridino]propionamide,
N-2-propinyloxy-β-[4-(2-methylaminophenyl)-1,2,5,6-tetrahydropyridino]propionamide,
N-2-propinyloxy-β-[4-(3-diethylaminophenyl)-1,2,5,6-tetrahydropyridino]propionamide,
N-2-propinyl-β-[4-(2-acetylphenyl)-1,2,5,6-tetrahydropyridino]propionamide,
N-2-propinyl-β-[4-(4-acetamidophenyl)-1,2,5,6-tetrahydropyridino]propionamide,
N-2-propinyl-β-[4-(2-propylthiophenyl)-1,2,5,6-tetrahydropyridino]propionamide,
N-2-propinyl-β-[4-(2-hydroxy-4-nitrophenyl)-1,2,5,6-tetrahydropyridino]propionamide,
N-2-propinyl-β-[4-(4-phenylphenyl)-1,2,5,6-tetrahydropyridino]propionamide,
N-2-propinyl-β-[4-(3-benzylphenyl)-1,2,5,6-tetrahydropyridino]propionamide,
N-2-propinyl-β-[4-(3-phenoxyphenyl)-1,2,5,6-tetrahydropyridino]propionamide,
N-2-propinyl-β-[4-(4-cyclohexylpheny)-1,2,5,6-tetrahydropyridino]propionamide,
N-2-propinyl-β-[4-(4-cycloheptyloxyphenyl)-1,2,5,6-tetrahydropyridino]propionamide,
N-2-propinyl-β-[4-(2-iodophenyl)-1,2,5,6-tetrahydropyridino]propionamide,
N-2-propinyl-β-[4-(3-methylthiophenyl)-1,2,5,6-tetrahydropyridino]propionamide, and N-2-propinyl-β-[4-(4-ethylsulfonyphenyl)-1,2,5,6-tetrahydropyridino]propionamide.

What is claimed is:

1. A compound selected from the group consisting of compounds of the formula

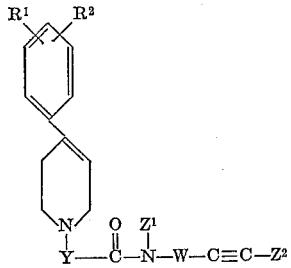

wherein
  R¹ and R² are each a member selected from the group consisting of hydrogen, chloro, bromo, iodo, fluoro, trifluoromethyl, amino, nitro, (lower)alkyl, (lower) alkoxy, hydroxy, phenyl, phenoxy, benzyl, (lower) alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive and cycloalkoxy radicals having from 5 to 7 carbon atoms inclusive,
  W is a member selected from the group consisting of oxy(lower)alkylene and (lower)alkylene,
  Y is a (lower)alkylene radical,
  Z¹ and Z² are each a member selected from the group consisting of hydrogen, (lower)alkyl, pyridyl, thienyl and radicals of the formulae

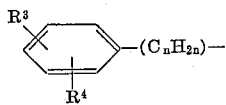

and

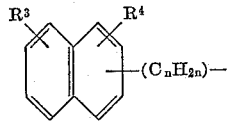

wherein
  n is a whole integer from 0 to 6 inclusive, and
  R³ and R⁴ are each a member selected from the group consisting of hydrogen, chloro, bromo, iodo, fluoro, trifluoromethyl, amino, nitro, (lower)alkyl, (lower)- alkoxy, hydroxy, phenyl, phenoxy, benzyl, (lower)- alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive and cycloalkoxy radicals having from 5 to 7 carbon atoms inclusive;
and the pharmaceutically acceptable nontoxic salts thereof.

2. A compound selected from the group consisting of compounds of the formula

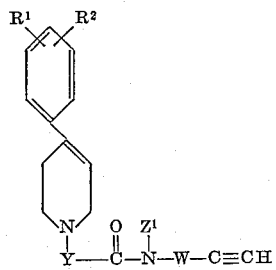

wherein
  R¹ and R² are each a member selected from the group consisting of hydrogen, chloro, bromo, iodo, fluoro, trifluoromethyl, amino, nitro, (lower)alkyl, (lower)- alkoxy, hydroxy, phenyl, phenoxy, benzyl, (lower)- alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive and cycloalkoxy radicals having from 5 to 7 carbon atoms inclusive,
  W is a member selected from the group consisting of oxy(lower)alkylene and (lower)alkylene,
  Y is a (lower)alkylene radical,
  Z¹ is a member selected from the group consisting of hydrogen, (lower)alkyl, pyridyl, thienyl and radicals of the formulae

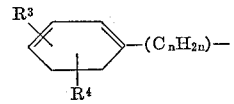

and

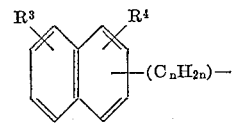

wherein
  n is a whole integer from 0 to 6 inclusive, and
  R³ and R⁴ are each a member selected from the group consisting of hydrogen, chloro, bromo, iodo, fluoro, trifluoromethyl, amino, nitro, (lower)alkyl, (lower)- alkoxy, hydroxy, phenyl, phenoxy, benzyl, (lower)- alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive and cycloalkoxy radicals having from 5 to 7 carbon atoms inclusive;
and the pharmaceutically acceptable nontoxic salts thereof.

3. A compound selected from the group consisting of compounds of the formula

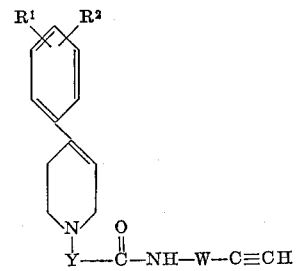

wherein
  R¹ and R² are each a member selected from the group consisting of hydrogen, chloro, bromo, iodo, fluoro, trifluoromethyl, amino, nitro, (lower)alkyl, (lower) alkoxy, hydroxy, phenol, phenoxy, benzyl, (lower) alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive and cycloalkoxy radicals having from 5 to 7 carbon atoms inclusive,
  W is a member selected from the group consisting of oxy(lower)alkylene and (lower)alkylene,
  Y is a (lower)alkylene radical;
and the pharmaceutically acceptable nontoxic salts thereof.

4. A compound selected from the group consisting of compounds of the formula

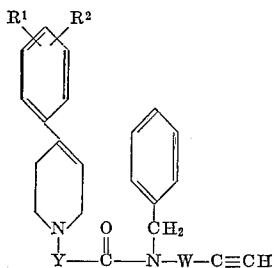

wherein $R^1$ and $R^2$ are each a member selected from the group consisting of hydrogen, chloro, bromo, iodo, fluoro, trifluoromethyl, amino, nitro, (lower)alkyl, (lower) alkoxy, hydroxy, phenyl, phenoxy, benzyl, (lower) alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive and cycloalkoxy radicals having from 5 to 7 carbon atoms inclusive, W is a member selected from the group consisting of oxy(lower)alkylene and (lower)alkylene, Y is a (lower)alkylene radical;

and the pharmaceutically acceptable nontoxic salts thereof.

5. A compound selected from the group consisting of compounds of the formula

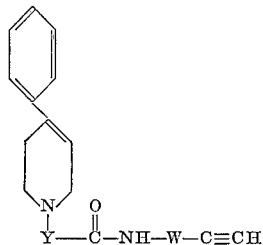

wherein

W is a member selected from the group consisting of oxy(lower)alkylene and (lower)alkylene, and Y is a (lower)alkylene radical;

and the pharmaceutically acceptable nontoxic salts thereof.

6. A compound selected from the group consisting of compounds of the formula

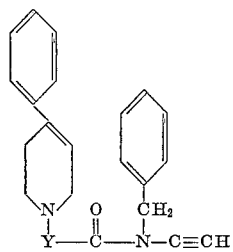

wherein

W is a member selected from the group consisting of oxy(lower)alkylene and (lower)alkylene, and Y is a (lower)alkylene radical;

and the pharmaceutically acceptable nontoxic salts thereof.

7. A compound of the formula

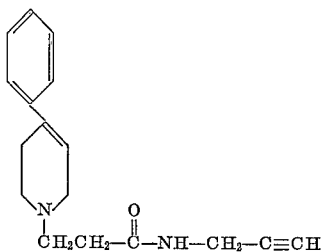

8. A compound of the formula

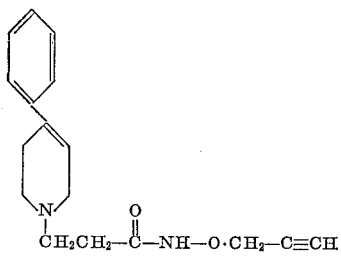

9. A compound of the formula

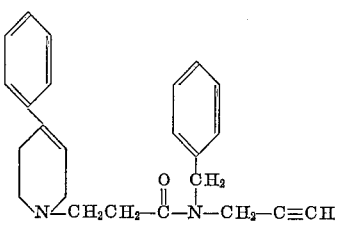

10. A compound of the formula

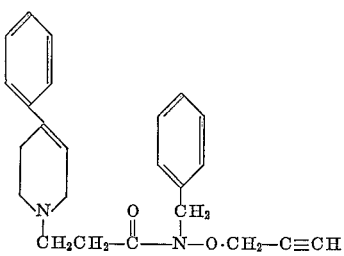

11. A compound of the formula

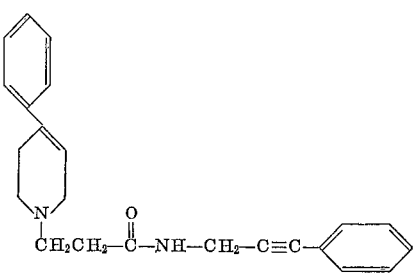

12. A compound selected from the group consisting of compounds of the formula

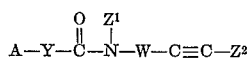

wherein

A is a radical selected from the group consisting of chloro, bromo, iodo and tosyl, W is a member selected from the group consisting of oxy(lower)alkylene and (lower)alkylene, Y is a (lower)alkylene radical, $Z^1$ and $Z^2$ are each a member selected from the group consisting of hydrogen, (lower)alkyl, pyridyl, thienyl and radicals of the formulae

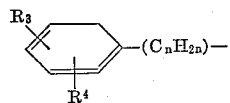

and

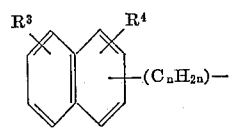

wherein n is a whole integer from 0 to 6 inclusive, and
$R^3$ and $R^4$ are each a member selected from the group consisting of hydrogen, chloro, bromo, iodo, fluoro, trifluoromethyl, amino, nitro, (lower)alkyl, (lower)-alkoxy, hydroxy, phenyl, phenoxy, benzyl, (lower)-alkylamino, di(lower)alkylamino, (lower)alkanoyl-amino, (lower)alkylthio, sulfamyl, (lower)alkanoyl, (lower)alkysulfonyl, methylenedioxy, cycloalkyl radicals having from 5 to 7 carbon atoms inclusive and cycloalkoxy radicals having from 5 to 7 carbon atoms inclusive;

and the pharmaceutically acceptable nontoxic salts thereof.

References Cited by the Examiner
UNITED STATES PATENTS

| | | | |
|---|---|---|---|
| 2,569,288 | 9/1951 | Cassell et al. | 260—562 |
| 2,929,818 | 3/1960 | Janssen | 260—295 |
| 3,072,648 | 1/1963 | Bonvicino | 260—240 |

WALTER A. MODANCE, *Primary Examiner.*